April 15, 1952     E. H. GIBBS     2,592,557
PNEUMATIC TIRE

Filed June 22, 1950     2 SHEETS—SHEET 1

*INVENTOR.*
EVERETT H. GIBBS
BY
ATTORNEY

April 15, 1952       E. H. GIBBS       2,592,557
PNEUMATIC TIRE
Filed June 22, 1950       2 SHEETS—SHEET 2
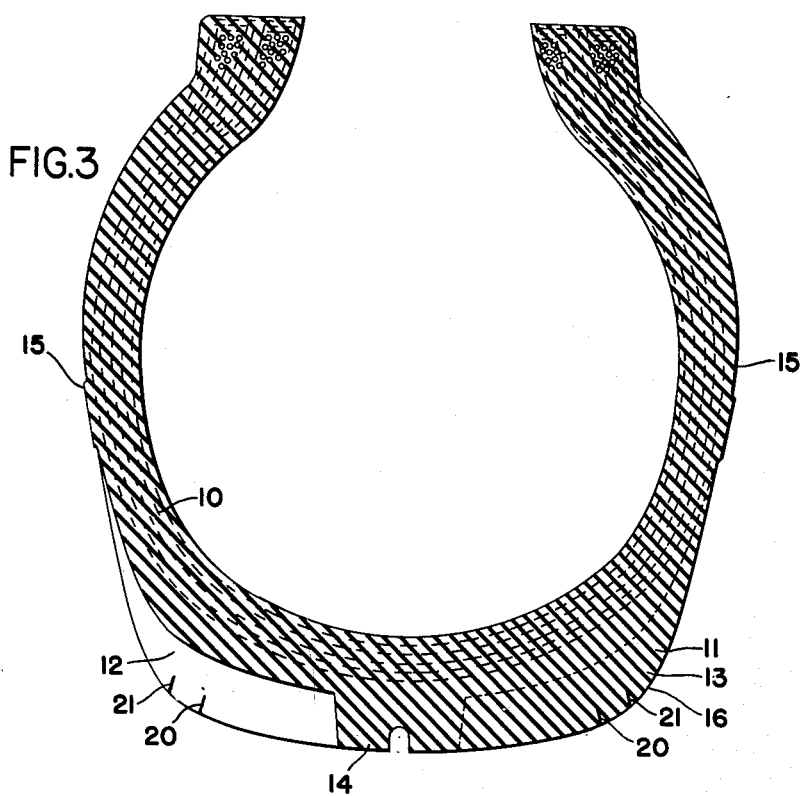
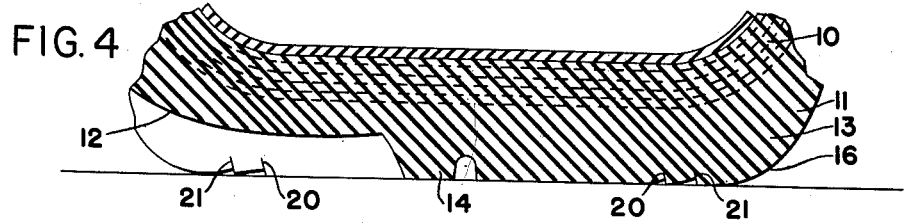
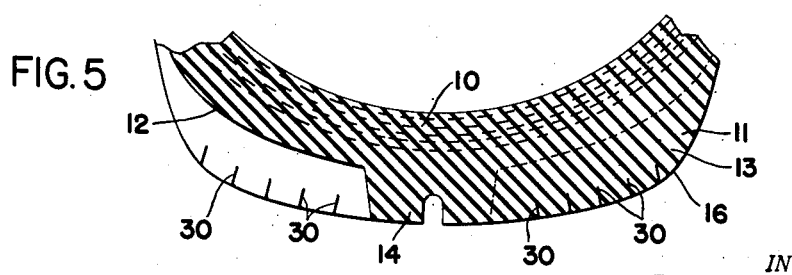
INVENTOR.
EVERETT H. GIBBS
BY
*William Cleland*
ATTORNEY Patented Apr. 15, 1952

2,592,557

UNITED STATES PATENT OFFICE 2,592,557

PNEUMATIC TIRE

Everett H. Gibbs, Wadsworth, Ohio, assignor to Seiberling Rubber Company, Akron, Ohio, a corporation of Delaware Application June 22, 1950, Serial No. 169,580

10 Claims. (Cl. 152—209)

1

This invention relates to pneumatic tires, and in particular relates to heavy duty pneumatic tires having traction lugs.

Heretofore, heavy duty tires as for large trucks or other vehicles, have been provided with rubber treads having central circumferential rib portions and heavy lugs extending therefrom. An objectionable feature of previous lug type tires, however, has been that while in highway service such tires had satisfactory forward traction and non-skid ability, resistance to sidewise skidding on slippery surfaces was not satisfactory. Provision of deep circumferential grooves near the center of the tread to overcome such sidewise skidding would result in cracking at the bases of the grooves, due to concentrated flexing and stretching of the rubber at the bases of the grooves. The stretching of the rubber is caused by growth of the tire.

It is an object of the present invention to provide a traction lug type tire having highly satisfactory characteristics with respect to forward traction and including improved means for preventing or minimizing sidewise skidding of the tire.

Another object of the invention is to provide a lug type tire of the character described which will provide long mileage in service without failure due to excessive heat generation.

Other objects of the invention will be manifest from the following brief description and the accompanying drawings.

Of the accompanying drawings:

Figure 3 is a transverse cross-section through the tire in normal vulcanized condition.

Figure 4 is a fragmentary cross-section of the tread portion of the tire under road conditions in which it is tending to skid to the left.

Figure 5 is a fragmentary cross-section, corresponding to the tread portion of Figure 3, illustrating a modified form of the invention.

Figure 1:
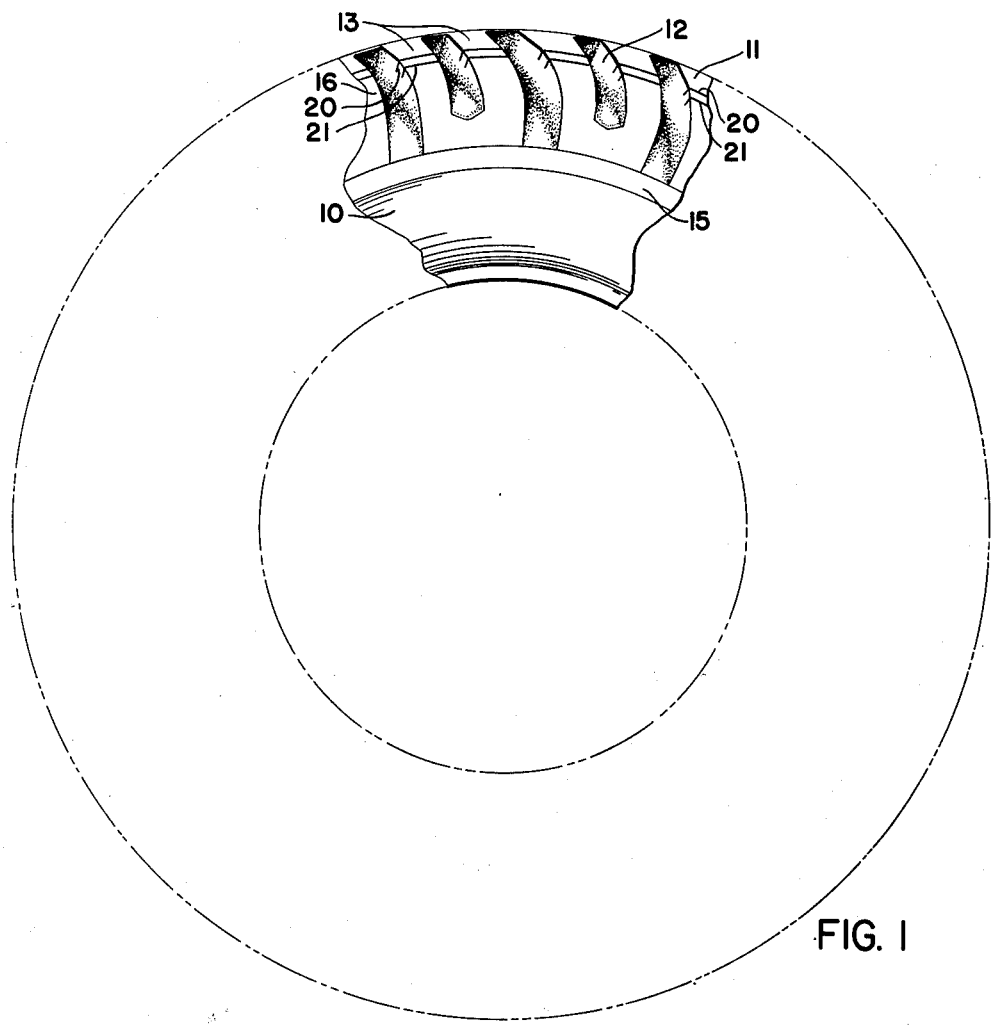
Figure 1 is a side elevation, partly broken away and partly shown in chain-dotted lines, illustrating a heavy duty truck tire embodying the features of the invention.
Figure 2:
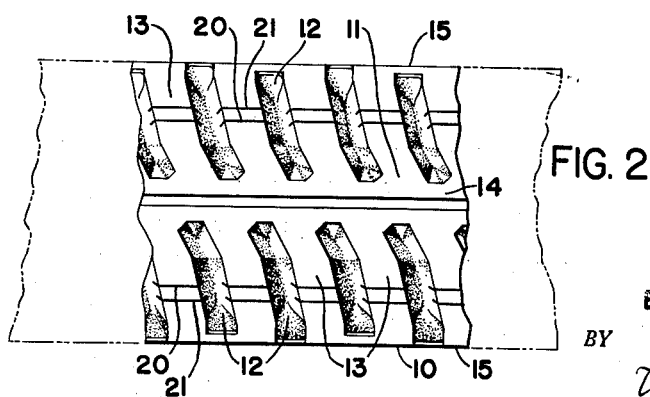
Figure 2 is a fragmentary edge view of said tire.

Referring particularly to Figures 1 to 4 of the drawings, there is illustrated a heavy duty truck tire (10.00–20), including the usual fabric-reinforced carcass 10 and a rubber tread portion 11. The tread is provided with non-skid configurations including opposite series of circumferentially spaced grooves 12, 12 of substantial depth, defining corresponding circumferentially spaced traction lugs or bars 13, 13, extending substantially in parallelism from each side of a central circumferentially continuous rib portion 14. Each traction lug 13 extends approximately a third of its length from rib portion 14 at an acute angle to the general plane thereof and for the remainder of its length at an obtuse angle to the shorter portion, and these angular portions of the lugs of one said series thereof are substantially parallel to the corresponding angular portions of the other series of lugs. The crown or outer ground-engaging surface portion of the tread is of known laterally arcuate shape, generally at a substantially radius from a point on the center line of the tire section. The wearing quality of the tire is substantially improved by rounding the edge portions of the lugs 13 at a substantial radius from the ground-engaging surface of the lug to an outer face of the lug blending into the usual rubber side wall portion 15 of the tire. This radius may be somewhat greater in measurement than the depth of the grooves 12.

A tire having a lug-type tread design as described will have satisfactory characteristics with respect to traction in forward rolling movement of the tire in normal use of the same on a highway, for example. That is, the heavy or solid lugs present a multiplicity of edges which are ample for forward traction, and the well rounded outer edge portions on the lugs minimize setting up stresses with lateral flexing of the tread portion which would be likely to generate damaging heat in the tread rubber.

A solid traction lug type of tire as described, however, does not provide resistance to sidewise skidding in service on a smooth highway, such as would be possible with the more flexible non-skid projections of known types of smaller tires, for example. Accordingly, as best shown in Figure 3, the present invention contemplates provision of pairs of spaced parallel slits or cuts 20 and 21 on each lug adjacent the outer edge portions thereof. Highly satisfactory results have been attained by positioning the outer slits 21 closely adjacent the points of juncture of the rounded ends 16 of the lugs 13, 13 and the crown of the tread, so that the inner slits 20 will fall within the width of contact of the tread with the road when the new tire is under normal load. As an example, the inner circumferential slits 20, 20 may be positioned outwardly of the tread center line 55% to 80% of the distance from the tread center line to the outer shoulder of the lugs, and the outer slits 21, 21 may be spaced from the slits 20, 20 10% to 20% of the distance from the tread center line to said outer shoulder of the lugs. For preventing excessive movement of the tread rubber during normal forward rolling of the tire, the slits 20 and 21 should be relatively narrow so that the block of rubber between the spaced slits 20 and 21 is supported against the adjacent tread rubber when the tire is under load. The widths of the slits (or slots) 20 and 21, for example, may be from zero to 1% of the total width of the tread, and they may extend inwardly to a depth of from one third to two-thirds of the depth of the grooves 12, 12 between the lugs. The inner slits 20, 20 may be substantially in planes or radials from the radius point of the arcuate crown, and as previously stated, with the outer slits 21, 21 parallel thereto.

In use of the improved tire, illustrated in Figures 1 to 4, under loaded condition thereof on a highway, should the tire tend to skid to one side or the other, such skidding will be prevented or minimized by flexing of the corner portions of the tread adjacent the slits 20, 21 in the opposite direction. Figure 4 shows the condition in which sidewise skidding tends toward the left. Thus, on each lug in lateral sliding contact with the road surface two edge portions or corners will be presented against said surface to stop the sliding movement. In normal forward rolling movement of the tire, without lateral swaying motion these flexible edge portions do not materially minimize the previously described firm forward tractional qualities of the lugs.

In the modification of the invention shown in Figure 5, the tread is substantially as shown in Figure 3, except that a plurality of spaced parallel slits or slots 30, 30 are provided along the full lengths of the traction lugs, the two outermost slits on each lug being arranged the same as slits 20 and 21 in Figure 3. The spacing and depth proportions of the slits are otherwise as before, but in any event, the purpose of the slits or slots is to minimize lateral skidding in service without substantially reducing the desirable forward traction qualities of the type of tread design illustrated.

Modifications of the invention may be resorted to without departing from the spirit thereof, or the scope of the appended claims.

What is claimed is:

1. A pneumatic tire having a tread portion of elastic material provided with anti-skid configurations including a central circumferential portion and circumferentially spaced traction lugs integral therewith and extending laterally therefrom to adjacent the opposite side edges of said tread portion, said lugs being generally substantial and solid and therefore substantially resistant to flexing action under normal load stresses in use of the tire, said laterally extending lugs having adjacent the edges of the tread portion a plurality of laterally spaced slits extending circumferentially across the lugs and radially inwardly of the tread surface to a substantial depth without materially reducing the substantial forward traction qualities of the tire, said slits forming blocks which are laterally flexible in said use of the tire to minimize lateral skidding of the same.

2. A pneumatic tire having a tread portion of elastic material provided with anti-skid configurations including a central circumferential portion and circumferentially spaced traction lugs integral therewith and extending laterally therefrom to adjacent the opposite side edges of said tread portion, said lugs being generally substantial and solid and therefore substantially resistant to flexing action under normal load stresses in use of the tire, said laterally extending lugs having adjacent the edges of the tread portion a pair of laterally spaced slits extending circumferentially across the lugs and radially inwardly of the tread surface to a substantial depth without materially reducing the substantial forward traction qualities of the tire, said slits forming blocks adjacent said edges of the tread portions which are laterally flexible in said use of the tire to minimize lateral skidding of the same.

3. A pneumatic tire having a tread portion of elastic material provided with anti-skid configurations including a central circumferential portion and circumferentially spaced traction lugs integral therewith and extending laterally therefrom to adjacent the opposite side edges of said tread portion, said lugs being generally substantial and solid and therefore substantially resistant to flexing action under normal load stresses in use of the tire, said laterally extending lugs having adjacent the edges of the tread portion a pair of laterally spaced slits extending circumferentially across the lugs and radially inwardly of the tread surface to a substantial depth without materially reducing the substantial forward traction qualities of the tire, said slits forming blocks adjacent said edges of the tread portions which are laterally flexible in said use of the tire to minimize lateral skidding of the same, said lugs being rounded at the outer edges thereof on a substantial radius.

4. A pneumatic tire having a tread portion of elastic material provided with anti-skid configurations including a central circumferential portion and circumferentially spaced traction lugs integral therewith and extending laterally therefrom to adjacent the opposite side edges of said tread portion, said lugs being generally substantial and solid and therefore substantially resistant to flexing action under normal load stresses in use of the tire, said laterally extending lugs having adjacent the edges of the tread portion a pair of laterally spaced slits extending circumferentially across the lugs and radially inwardly of the tread surface to a substantial depth without materially reducing the substantial forward traction qualities of the tire, said slits forming blocks adjacent said edges of the tread portions which are laterally flexible in said use of the tire to minimize lateral skidding of the same, said lugs being grounded at the outer edges thereof at a radius approximating at least the depth of the spaces between the lugs, the innermost slit of each lug being adjacent the juncture of the radius and the crown of the tire tread.

5. A pneumatic tire having a tread portion of elastic material provided with anti-skid configurations including a central circumferential portion and circumferentially spaced traction lugs integral therewith and extending laterally therefrom to adjacent the opposite side edges of said tread portion, said lugs being generally substantial and solid and therefore substantially resistant to flexing action under normal load stresses in use of the tire, said laterally extending lugs having adjacent the edges of the tread portion a pair of laterally spaced slits extending circumferentially across the lugs and radially inwardly of the tread surface to a substantial depth without materially reducing the substantial forward traction qualities of the tire, said slits forming blocks adjacent said edges of the tread portions which are laterally flexible in said use of the tire to minimize lateral skidding of the same, the crown of the tire tread being laterally arcuate generally at a substantial radius from a lateral center line of the tire, the innermost slit of each said lug being substantially in a plane on a radial from the radius point of said arcuate crown, and the outermost slit being substantially parallel to the innermost slit.

6. A pneumatic tire having a tread portion of elastic material provided with anti-skid configurations including a central circumferential portion and circumferentially spaced traction lugs integral therewith and extending laterally therefrom to adjacent the opposite side edges of said tread portion, said lugs being generally substantial and solid and therefore substantially resistant to flexing action under normal load stresses in use of the tire, said laterally extending lugs having adjacent the edges of the tread portion a pair of laterally spaced slits extending circumferentially across the lugs and radially inwardly of the tread surface to a substantial depth without materially reducing the substantial forward traction qualities of the tire, said slits forming blocks adjacent said edges of the tread portions which are laterally flexible in said use of the tire to minimize lateral skidding of the same, said lugs being rounded at the outer edges thereof at a radius approximating the depth of the spaces between the lugs, the inner most slit of each lug being adjacent the juncture of the radius and the crown of the tire tread, said spaced slits of the lugs being substantially parallel.

7. A tire having a tread portion of elastic material provided with anti-skid configurations including circumferentially spaced traction lugs extending laterally from the central portion of the tread to adjacent the opposite side edges of said tread portion, said lugs being generally substantial and solid and therefore substantially resistant to flexing action under normal load stresses in use of the tire, said laterally extending lugs having a plurality of laterally spaced slits extending circumferentially across the lugs and radially inwardly of the tread surface to a substantial depth without materially reducing the substantial forward traction qualities of the tire, said slits forming blocks which are laterally flexible in said use of the tire to minimize lateral skidding of the same.

8. A tire having a tread portion of elastic material provided with anti-skid configurations including circumferentially spaced traction lugs extending laterally from the central portion of the tread to adjacent the opposite side edges of said tread portion, said lugs being generally substantial and solid and therefore substantially resistant to flexing action under normal load stresses in use of the tire, said laterally extending lugs having adjacent the edges of the tread portion a pair of laterally spaced slits extending circumferentially across the lugs and radially inwardly of the tread surface to a substantial depth without materially reducing the substantial forward traction qualities of the tire, said slits forming blocks adjacent said edges of the tread portions which are laterally flexible in said use of the tire to minimize lateral skidding of the same, said lugs being rounded at the outer edges thereof at a radius approximating at least the depth of the spaces between the lugs, the innermost slit of each lug being adjacent the juncture of the radius of said rounded edge and the crown of the tire tread, said spaced slits of the lugs being substantially parallel.

9. A tire having a tread portion of elastic material provided with anti-skid configurations including circumferentially spaced traction lugs extending laterally from the central portion of the tread to adjacent the opposite side edges of said tread portion, said lugs being generally substantial and solid and therefore substantially resistant to flexing action under normal load stresses in use of the tire, said laterally extending lugs having a plurality of laterally spaced slits extending circumferentially across each lug and radially inwardly of the tread surface to a substantial depth without materially reducing the substantial forward traction qualities of the tire, said slits forming blocks which are laterally flexible in said use of the tire to minimize lateral skidding of the same.

10. A tire having a tread portion of elastic material provided with anti-skid configurations including circumferentially spaced traction lugs extending laterally from the central portion of the tread to adjacent the opposite side edges of said tread portion, said lugs being generally substantial and solid and therefore substantially resistant to flexing action under normal load stresses in use of the tire, said laterally extending lugs having at least one slot extending circumferentially across each lug and radially inwardly of the tread surface to a substantial depth without materially reducing the substantial forward traction qualities of the tire.

EVERETT H. GIBBS.

REFERENCES CITED

The following references are of record in the file of this patent:

UNITED STATES PATENTS

| Number | Name | Date |
|---|---|---|
| D. 102,275 | Hubener | Dec. 8, 1936 |
| 2,000,785 | Nellen | May 7, 1935 |
| 2,094,636 | Bull | Oct. 5, 1937 |